May 4, 1971     H. A. GUYER     3,577,304

APPARATUS FOR CONTINUOUS LAMINATION

Filed June 30, 1967     6 Sheets-Sheet 1

INVENTOR
Hubert A. Guyer
BY
ATTORNEY

United States Patent Office 3,577,304
Patented May 4, 1971

3,577,304
APPARATUS FOR CONTINUOUS LAMINATION
Hubert A. Guyer, 119 Ridgeland Road,
Lynnfield, Wilmington, Del. 19803
Filed June 30, 1967, Ser. No. 650,368
Int. Cl. B32b 31/00
U.S. Cl. 156—555
13 Claims

ABSTRACT OF THE DISCLOSURE

Materials to be laminated are passed between two continuous opposed bodies, as, for example, opposed pressure elements on the backside of two continuous belts which operate in alternation to apply pressure with or without heat, to the belts and hence to the laminate. The pressure elements also move the belt. One of the pressure elements is spring loaded and floating so as to maintain constant pressure at all times on the portion of the belts and the material being laminated while said portion is in the laminating process.

This invention relates to a method and apparatus for laminating materials and, more particularly, to a method and apparatus for rapidly laminating material with a high degree of reproducibility in resultant physical characteristics.

In today's world there are many requirements for laminating materials together under heat and pressure conditions. This is true, for example, in the field of encapsulating printed material with a plastic coating for protection from wear, alteration and bending. In other applications it is desirable to produce a sheet of laminated material in which one of the components parts may provide strength and the remaining component parts are desired color, surface characteristics, or otherwise. Whatever the application, those machines that are currently available suffer a number of disadvantages. None of the prior art devices has satisfactorily solved the problem of keeping a laminate under pressure during a time dwell. These machines are unable generally to produce laminated materials that have close reproduction in their physical characteristics. For example, laminates made on different days or even at different times during a given day vary in their thickness, strength, and quality. In fact, few in the industry are able to obtain reproducible laminations over a period of time which vary in their characteristics less than 10%. Other machines are unable to produce a continuous laminate.

It is therefore, an object of this invention to obviate many of the disadvantages inherent in the prior art laminating machines and methods. Among the disadvantages inherent in the prior art machines is their inability to produce flat strips of materials. Most of the laminates produced with these machines have some curvature and are unable to lie flat. Accordingly, its an object of this invention to provide an improved method of laminating materials in a continuous manner.

In accordance with the preferred method of my invention the strips or webs or powder of material to be laminated are fed between two continuous belts which are passed between two opposed heated platen assemblies. During the time that the belts and material to be laminated pass between the platen assemblies, at which time they are subjected to heat and pressure, they are permitted, in effect, to float; they are moved while under pressure and thereby conform precisely to the physical location of the heat and pressure of the platen assemblies. Further, in accordance with the method of this invention the pressure is applied to the opposing back surfaces of the belts by pressure members which are in a side-by-side parallel relationship to the direction of motion of the laminate alternatively applying pressure to the laminate and periodically advancing the belt and laminate through the platen assemblies.

In accordance with a preferred embodiment of this invention the material to be laminated is passed between two continuous belts through upper and lower platen assemblies. One of the platen assemblies is fixed in position and the second platen assembly is floating with respect to the first assembly. Each assembly consists of alternately disposed pressure blocks. In its simplest form, each platen assembly comprises three pressure blocks. The outer pressure block or element in each assembly is mounted on an eccentric cam so that each element operates in a successive manner to apply pressure in a continuous fashion to the back side of the continuous belt as it moves. The center pressure block of each platen assembly operates, when the outer blocks are not acting, to apply pressure to the middle portion of the continuous belt, and to hold the laminating assembly in readiness for the next horizontal movement. When the center pressure is removed, the center blocks then out of contact with the continuous belt, the outer pressure clamps or blocks apply pressure thereto. To permit this operation, one of the platen assemblies is permitted to float with respect to the second. The floating is accomplished by spring mounting the one platen assembly. The spring mounting permits a continuous pressure to be applied at all times to the belt and laminate therebetween. Further, with each rotation of the shafts contained in each outside pressure block, the continuous belt and laminate are successively advanced through the machine.

From the above it can be seen that the lamination is pressed together by a pressure means, which may be designated as a first means, that is activated also to move the laminate away from the inlet end a bit toward the outlet end of the apparatus; that a second means deactivates and activates this first means in a continuous, repetitive manner; and that a third means, also a pressure means, automatically exerts pressure on the lamination when the first means is not so doing and automatically ceases to exert pressure when the first means is activated to exert pressure and move the lamination. The spring mounting is one means for varying the distance between the two pressure means while keeping pressure on the material being pressed together. The pressure elements in each of the outer pressure blocks move toward or away from the other in a synchronized manner, and one of the pressure elements in the center pressure block moves toward the other pressure element in the center block, timed to do so when the two outer pressure blocks move to inactive positions.

The novel features that are considered characteristic of this invention are set forth with particularly in the appended claims. The invention, itself, however, both as to its organization and method of operation, as well as additional objects and advantages thereof, will best be understood from the following description when read in connection with the accompanying drawings, all of which is given for illustrative purposes only and is not limitative and in which:

FIG. 3 is a right side elevation view of an apparatus for continuously laminating materials constructed in accordance with one embodiment of this invention;

Figure 1:
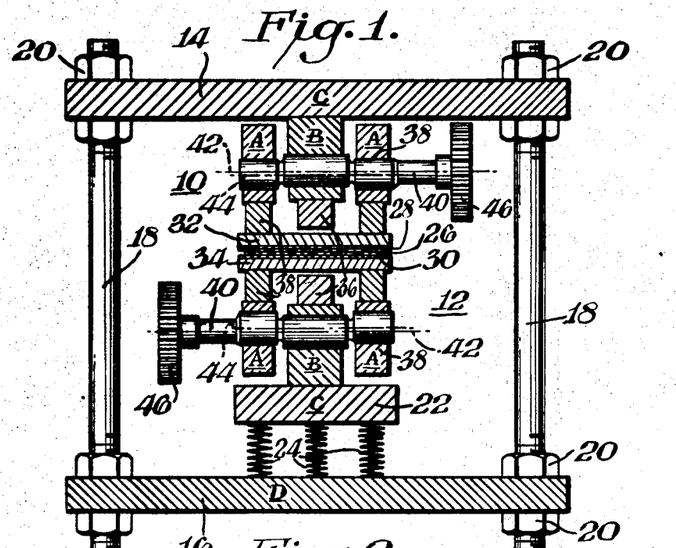
FIG. 1 is a diagrammatic cross-sectional view showing the operative features of a laminator constructed in accordance with this invention and as contained in the embodiment shown in FIG. 3.

The invention may be most easily understood with reference to FIG. 1. There are seen lower and upper pressure assemblies 10 and 12, respectively. As will be described the upper pressure assembly 10 is fixed in position to the upper support frame 14 and the lower pressure assembly 12 is mounted as to float with respect to a lower support frame 16 and with respect to the material being laminated, —that is, assembly 12 can move downwardly and upwardly as to frame 16. The upper and lower support frames 14 and 16 respectively, are accurately and fixedly positioned relative to each other by tie rods 18 and nuts 20 threaded on either end of the tie rods 18. The lower platen assembly 12 is fixedly mounted to a floating plate or support assembly 22. In turn the floating support assembly is positioned as by springs 24 to the lower support frame 16. The sheets or webs 26 of material to be laminated are positioned between two continuous belts 28 and 30, respectively which together with the webs 26 are seen in cross-section taken transverse to their longitudinal axis. In turn the stainless steel belts 28 and 30 are sandwiched between heated upper and lower platens 32 and 34 respectively. Pressure is applied to the respective platens 32 and 34 by means of the pressure assemblies 10 and 12. The pressure and its amount is attained and controlled by the extent of the compression of springs 24 or their equivalent such as hydraulic pistons. Each of the pressure assemblies 10 and 12 are substantially identical in structure and hence only the lower pressure assembly 12 will be decribed in detail, the same reference numerals being used for each.

Each of the pressure assemblies 10 and 12 include a center pressure bar or block 36 which is fixedly mounted, one to the upper support frame 14 and the lower to floating support assembly 22 as by bolts (not shown). Positioned on either side of the center pressure bars 36 across and spanning the transverse axis of the web 26 that is to be laminated are lifter bars 38, so called because, as will be seen, they, in effect, lift the laminate assembly from the center pressure bars 36. Each of the upper and lower pressure assemblies 10 and 12 has journaled in the center of its respective pressure bar 36, a shaft 40, the primary axis 42 of the crank shaft denoted by the dash-dot line so numbered.

Each of the crank shafts 40 includes an off-set or crank portion 44 which is journaled into the lifter bars 38. In the various lifter bars 38 the angular position of the off-set 44 for both lifters is the same. The crank shaft 40 is thus seen to be of the single throw type wherein the position of the center pressure bar 36 remains fixed in relation to the axis of the crank shaft. The position of the lifter bars 38, however, varies dependent upon the eccentricity of the off-set. The crank shaft is turned through a suitable gear drive illustrated by the gear 46 and the gears 46 for the upper and lower pressure assemblies 10 and 12 are driven in opposite directions for reasons which will be discussed.

The operation or method by which the laminate is formed using the apparatus illustrated in FIG. 1 may perhaps be more easily understood with reference to the FIGS. 6 through 9 of the drawing. These figures illustrate successive positions of the respective center pressure bars 36 and lifter bars 38, it being appreciated that the bars span the width of the laminate and are shown in broken form for convenience. As a function of the rotation of the crank shaft 40, these FIGS. 6 through 9 are shown in side elevation view of only that portion of the web 26 and upper and lower platens 32 and 34, respectively, as exist between only the center portion of the center pressure bar 36 and outer lifter bar 38 in the vicinity of the crank shaft 40.

Figure 6:
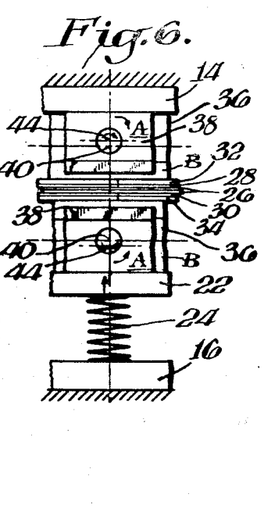
FIGS. 6, 7, 8 and 9 are fragmented elevation side views showing the pressure bars of this invention in successive stages of operation.

The position shown in FIG. 6 is that in which the off-set portions 44 of the respective crank shafts 40 are closest to the adjacent upper support frame 14 and in the one instance to the floating support assembly 22 in the other. These conditions will be assumed to be zero degrees of rotation of the crank shafts 40. The center pressure bars 36 are in contact with the upper and lower platens 32 and 34, respectively, because the compression springs 24 pushing upwardly exert a predetermined pressure against the lower bar 36 and in turn on the platens, and, hence, against the webs 26. The lifter bars 38 are withdrawn and not in contact with the platens 32, 34, respectively. Springs 24 are in their most expanded position.

Figure 7:
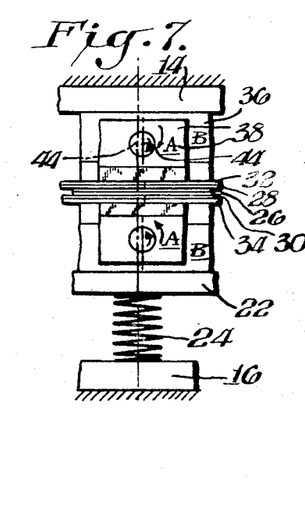

In FIG. 7 the crank shafts 40 have rotated in opposite directions (one clockwise and the other counter-clockwise) by 90 degrees such that the lifters bars 38 have both moved to the point that each is now in contact with a respective platen, 32 or 34. The upper lifter bar has been forced downwardly while the lower one has been forced upwardly. The vertical position of the platens, webs, etc., remains unchanged at this state.

Figure 8:
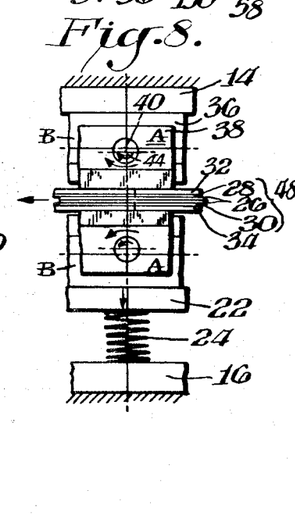
Figure 9:
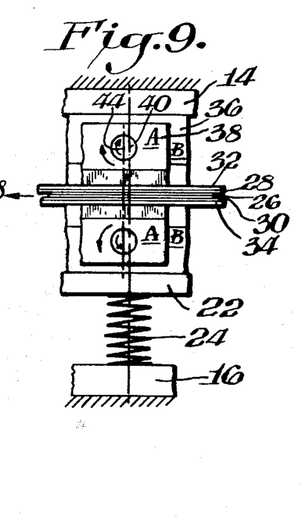

As the rotations of the crank shaft 40 continue to the 180° points as seen in FIG. 8, the pressure against the platens 32 and 34 is now exerted only by the lifter bars 38. Due to the cam action of the off-sets 44, or the lifting action of bars 38, the upper platen and hence the lower platen 34 including the webs 26 to be laminated and the belts 28 and 30 are lowered slightly in position so that they are no longer in contact with the center pressure bars 36. The upper bars 38 have forced the sandwich assembly down on to the lower bars 38 and off the upper center block 36. Since the lower block 36 is integral with the floating assembly, it is lowered also, so that it is out of contact with the sandwich. The platens 32 and 34, as well as the sandwiched assembly including the belts 28 and 30 and the webs 26 which sandwich assembly is hereinafter referred to as sandwich assembly 48 is thus, lowered in position relative to the upper and lower support frames 14 and 16, respectively. The action of the floating support assembly 22, which is floated on springs 24 or the like, permits this to take place and yet maintains pressure on the sandwich assembly 48. The springs 24 are now in their most compressed condition.

As the rotation of the crank shafts 40 continue from 90° through 270° of a given cycle, the lifter bars 38 impart a longitudinal motion in the direction of the movement of the sandwich assembly 48 through the apparatus. This longitudinal movement is permitted by a rotary-like motion of the lifter bars 38 and by the floating of the lower pressure assembly 12 so as to permit the slight variations in vertical position of the sandwich assembly 48 which has occurred as a result of the rotary motion. Thus, advantage is taken of the traverse of the longitudinal movement of the lifter bars 38 to impart the necessary longitudinal motion as well as pressure to the sandwich assembly 48. In FIGS. 6–9 arrows indicate the rotation of the shafts 40 and the lifter bars 38. The lifter bars 38 do not rotate in an end-over-end fashion; rather each bar in effect is picked up, moved over, moved down and then moved back in a repetitive, rotary-like motion. At this movement continues it will be noted in FIG. 9 that the lifter bars 38 have now been withdrawn to the point that the center pressure bars 36 again contact the sandwich assembly 48. With further rotation of the crank shafts 40, the lifter bars 38 continue their withdrawal until the 0° point is reached as seen in FIG. 6. The cycle then respeats.

It may be seen that during each cycle, the pressure on the sandwich assembly 48 is maintained constant, and periodically during a portion of each cycle the sandwich assembly 48 is advanced through the apparatus.

The advantages of this arrangement is such that by employing pressure in a continuously repetitive uniform fashion to alternate portions of the upper and lower platens 32 and 34, respectively, a greater pressure may be applied to the laminate and a greater uniformity of pressure may be obtained and, most importantly, the pressure is maintained over a time period that allows the advance of the laminate. This results in the ability of the apparatus and method of this invention to produce a laminate having highly reproducible physical characteristics. The thickness, strength and quality of the laminate may be maintained relatively constant. Furthermore, by using a plurality of groups of units comprising center pressure bars and lifter bars in a line arrangement laminations having relatively great widths may be formed.

The belts 28 and 30 may be formed of stainless steel. The bearings employed to journal the crank shaft to the respective center pressure bars 36 and lifter bars 38 may be conventional sleeve bearings, ball bearings, pin bearings, or other suitable bearings of known type. The platens (32, 34) may be constructed of sheets of metal having a relatively good coefficient of thermal conductivity. Suitable metals of this type are aluminum and copper.

A preferred embodiment of the entire machine constructed in accordance with this invention is illustrated in FIGS. 3, 4, 5, 12 and 13. As seen in FIG. 3, there is a chassis 50 on which is supported an electrical motor 52 with an appropriate gear reduction box driving a sprocket 54 which transmits power from the motor through a chain drive 56 to a second driver sprocket 58. As will be explained below the motor and gear arrangement effects the rotation of cams 44. Appropriate controls for the electrical motor 52 may include a fuse box, motor control, and switch assembly 60 shown in FIG. 4. Positioned on top of the chassis 50 are vertical angle members 62. These angle members 62 are positioned at either end of the chassis and in turn support upper and lower drums 64 on which the respective upper and lower continuous belts 28 and 30 and platens 32, 34, respectively are supported. The drums 64 are mounted on appropriate axles 66 positioned in the angle members 62. Each of the continuous belts 28 and 30 and platens 32, 34 are seen to be positioned in the form of elongated loops covering substantially the entire length of the chassis 50. One of the belt loops is mounted above the other so that the lower outer surface of the upper belt 28 and the upper outer surface of the lower belt 30 are adjacent each other. Sheets or webs of the material 26 to be laminated are supplied from spools 67 each of which may be mounted on its own spindle and mounting assembly (not shown). The webs 26 from the supply spool 67 follow a path between the belt drums 64 so as to lie in the sandwich formed by the belts 28 and 30 and the platens 34 and 32, as shown in FIG. 1. Thus positioned, the sandwich comprising the webs and belts and platens as described pass between the upper pressure assembly 10 and the lower pressure assembly 12 and between the left hand belt belt drums 64, the lamination 98 going, e.g. to a take-up spool 68. The take-up spool 68 again is mounted on it own spindle and frame mounting assembly (not shown).

As seen in FIG. 3 only two supply spools 67 are shown. Obviously many spools of different materials could conveniently be mounted and in some instances three or more webs of material are required for a specific lamination.

Figure 5:
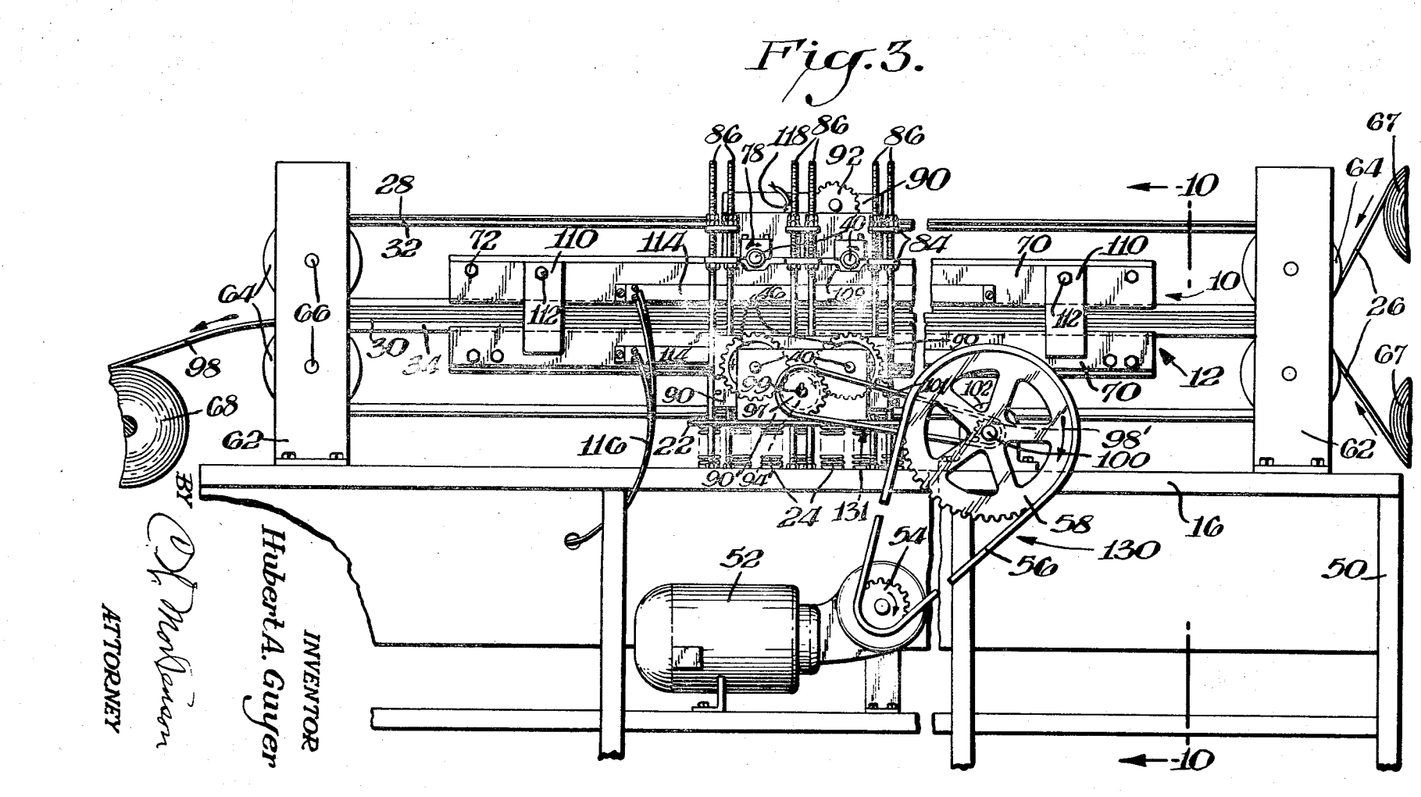
FIG. 5 is a top plan view of the apparatus illustrated in FIG. 3.
Figure 10:
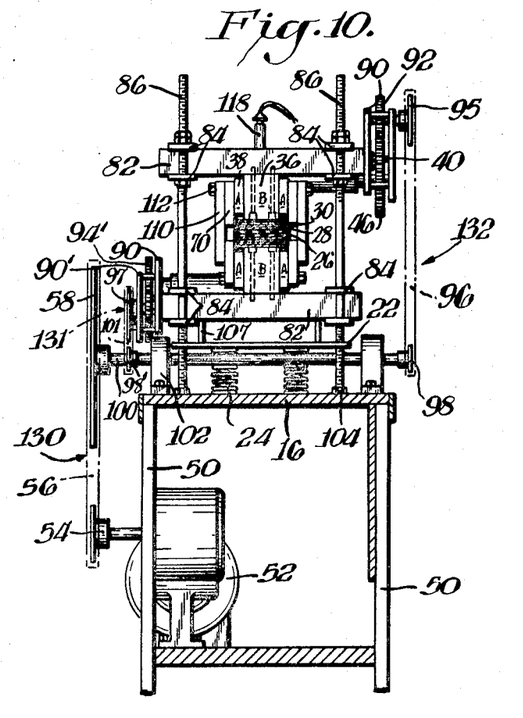
FIG. 10 is a rear elevational view of the apparatus illustrated in FIG. 3.
Figure 12:
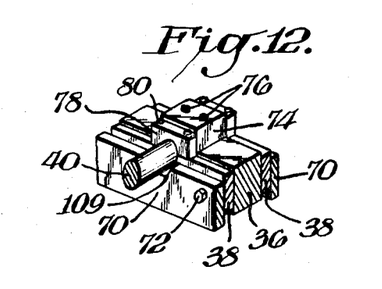
FIG. 12 is a pictorial view showing the manner in which the pressure bars employed in the apparatus of FIG. 3 are mounted on their crankshaft.

The upper and lower pressure assemblies 10 and 12 are constructed and mounted in similar fashion. Each comprises a center pressure bar 36 which is seen perhaps most clearly in FIGS. 5 and 12. The center pressure bars 36 and the outside lift bars 38 are equally of essentially equal length and mounted in side-by-side relationship with the lifter bars 38 on either side of the center pressure bar 36, all being disposed in a longitudinal relationship and running almost the length of the apparatus. The bars 36 and 38 may comprise elongated rectangular pieces of metal stock such as steel. On the exposed faces of the lifter bars 38, platen guide bars 70 are secured to the outside edges of the lifter bars 38 so as to extend slightly below the bottom edge of the lifter bars 38, as shown in FIG. 12. These guide bars serve to prevent any sidewise movement of the platens. The platen guide bars 70 are secured to the lifter bars 38 by any suitable means such as bolt 72, or the lifter bar and guide bar may be unitary. In the upper center portion of both the lifter bars 38 as well as the center pressure bar 36 there is a transversely disposed crank shaft 40. A given crank shaft 40 is journaled in its respective center pressure bar 36 as may be seen perhaps most clearly in FIG. 12. The journaling includes a bearing cap 74 which is bolted to the remainder of the center pressure bar 36 as by bolts 76. Next, both of the lifter bars 38 have the crank shaft 40 journaled therein with the aid of separate bearing caps 78 which are attached to the lifter bars 38 as by bolts 80. In this case the bearing is formed about an off-set or throw portion of the crank shaft 40 which off-set is described in conjunction with FIG. 1. The respective center pressure bars 36 and lifter bars 38 are free to slide longitudinally and vertically relative to one another. Thus, when the crank shaft 40 turns, the center pressure bar 36 remains relatively stationary where as the outer lifter bars 38 each go through the circular or oscillating path about the center axis 42 (FIG. 1) of the crank shaft 40, as described above. FIG. 5 shows a dual arrangement of crank shafts, as do other figures, which may be used but it will be appreciated that a single arrangement may be used and that whether single or dual or multiple arrangements are used, as many of such arrangements as necessary can be placed along all of or substantial parts of the length of the apparatus as to effect the desired pressure and the longitudinal movement of the materials being treated. As can be seen in FIG. 10, the drive shaft of motor 52 drives jack shaft 100 through driving arrangement 130. A power take-off is effected on the left side of the apparatus and the resultant driving arrangement 131 is used to rotate the crank shafts 40 that activate the lower lifter bars 38. The jack shaft 100 is used in effecting the power take-off 132 on the right side of the apparatus and this driving arrangement 132 is used to activate the upper lifter bars 38.

Figure 13:
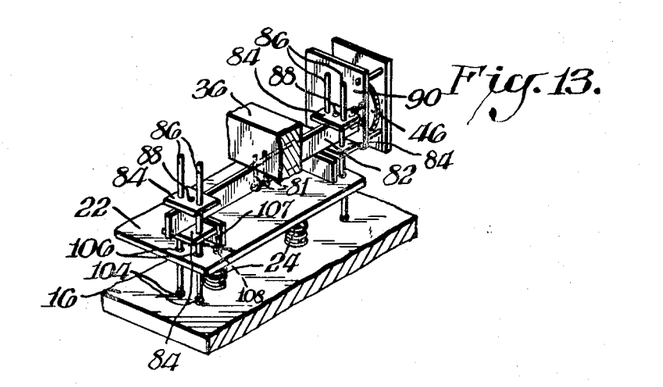
FIG. 13 is a partial pictorial view showing the floating support assembly employed to support the lower platen assembly illustrated in FIG. 3.

Before discussing the various drive arrangements reference is again made to the floating arrangement and the provision for the longitudinal movements of the subject pressure elements and of the laminate. Both the upper and lower pressure assemblies are of silimar construction and hence only the lower is illustrated in detail in FIG. 13. The lower pressure assembly 12 or the floating unit is slidably mounted on the chassis and the upper pressure assembly is fixedly mounted, as will be described. In each of the pressure assemblies, the center pressure bar 36 is secured by bolts 81 to a plurality of horizontal cross members 82 which are positioned along the length of the apparatus. In turn each of the horizontal cross members 82, which may be rectangular bars of appropriate metal stock such as steel, is secured in position at either end by an upper and lower vertical guide block 84. In the lower assembly 12, each vertical guide block 84 is made from a rectangular piece of metal stock having holes drilled therein so as to fit over and slide vertically along vertically disposed tie rods 86. Appropriate bolts 88 securely clamp the vertical blocks 84 to the top and bottom edges of the horizontal cross members 82 at either end so as to fix the horizontal cross members in a particular position. The back end of each of the horizontal cross members 82 (as seen in the drawing of FIG. 13) has mounted thereto a bearing plate 90. Spur gears 46 on the outside of plate 90 are on the ends of the crank shafts 40 which shafts are positioned through the bearing plate 90. In turn, the lower spur gears 46 are driven by a drive gear 94′ keyed to a spindle 99 (FIG. 3 or 5) journaled in the bearing plates 90 and 90′ and driven by a sprocket 97 which is rotated by the drive sprocket 98′ seen in FIG. 3 or 5 through the chain 101 (FIG. 3).

Figure 4:
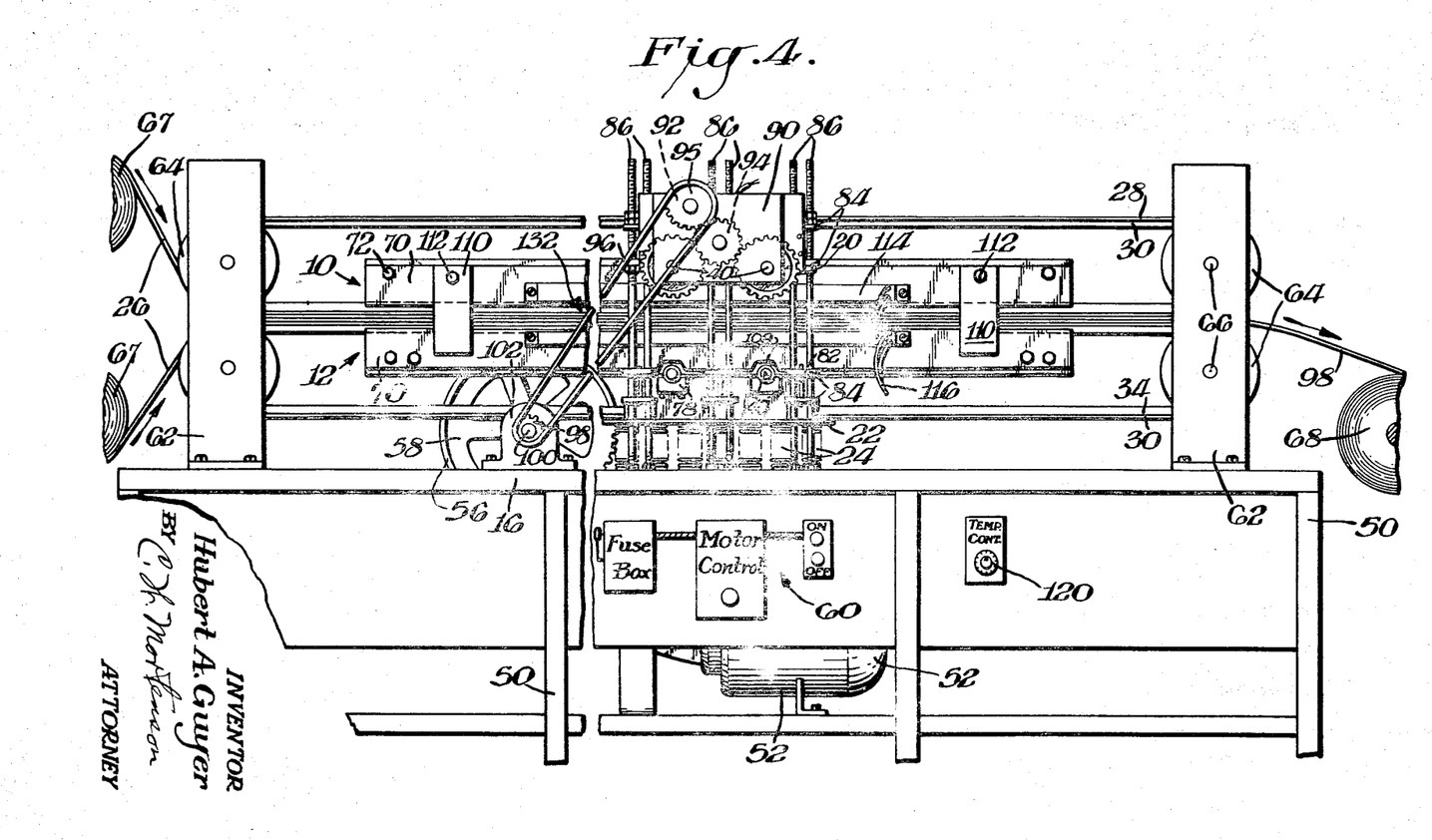
FIG. 4 is a left side elevation view of the apparatus illustrated in FIG. 3.

The upper pressure assembly 10 is substantially identical to that of lower pressure assembly 12. The primary differences are that the crank shafts 40 in the upper assembly are driven from the opposite side of the chassis—that is, the front side as seen in FIG. 4. Also, the vertical guide blocks 84 are fixed to the tie rods 86 by nuts 20 and are not mounted thereon by the sleeve bearings 106 (FIG. 13) used for the lower assembly 12. It should be mentioned that the tie rods 86 are bolted at their lower end as by suitable nuts 104 to the chassis 50 in a vertical or upright position. The upper assembly drive (FIG. 4) includes an idler gear 94 as well as a spur gear. Both are mounted on spindles which are journaled in the bearing plates 90, 90′. The spur gear 92 is powered by a chain drive 96 driven by a sprocket 98. A sprocket 98 is mounted on the front end of a spindle or jack shaft 100 which is rotated by the drive sprocket 58 as seen in FIG. 3. The sprocket 98 is mounted by an appropriate bearing block 102 of conventional type which bearing is mounted on chassis 50 as shown in FIG. 4.

Returning now to FIG. 13, the lower or floating assembly 12 is supported by a floating plate 22 which includes sleeve bearing 106 so that the plate 22 may move vertically up and down tie rods 86. The floating plate 22 is in turn supported by the springs 24 which are supported at the bottommost end by the chassis 50. Additionally, a spacer bar 107 which is in the form of a rectangular cross section piece of metal stock is bolted to the floating spacer plate 22 as by a screw 108. The spacer bar 107 maintains a minimal spacing between the floating plate 22 on the one hand and the horizontal cross member 82. The horizontal cross members 82, are supported at each end by substantially identically constructed guide blocks as seen in FIG. 13. This permits the lower platen assembly as seen in FIGS. 6 through 9 inclusive to move vertically upwardly or downwardly in order to follow the sandwich assembly 48 and maintain constant pressure on the lamination being effected due to the action of the springs which is described hereinbefore.

To permit longitudinal motion along the chassis of the upper and lower pressure assemblies, the outer platen guide bars 70 each have formed at the center portion thereof slots 109 (FIG. 4) to accommodate the longitudinal motion of the crank shafts 40. It will be recalled that the platen guide bars are fixedly secured to the lifter bars 38. In addition, guide members 110 (FIG. 3) are secured to the outside edges of the upper platen guide bars 70 in the upper pressure assembly 10 and are disposed downwardly so as to lie on the outside of, but not fixed to, the corresponding platen guide bars 70 of the lower pressure assembly. This maintains the proper lateral alignment of the upper and lower pressure assemblies 10 and 12 with respect to each other. The guide members 110 are secured to the upper, fixed pressure guide bars 70 as by bolts 112. In another embodiment guide bars 70 are not secured to spacer bars 38 but are secured to the frame bars. Heating elements 114 (FIG. 3) may be bolted to the guide bars 70 or elements 36. As shown in the drawing the heating elements 114 are basically in the form of a plate and are disposed to heat sandwich assembly 48 indirectly. The heating elements 114 are supplied by appropriate power through a line 116, a thermostat element 118 operating in conjunction with a temperature controller indicated by the dial 120 thereby maintaining whatever temperature is set by the controller in the heating plates at all times. Conventional controls may be used.

By way of summary, it is noted that under the driving power, motor 52, the crank shafts 40 in the lower pressure assembly are turned in one direction and the crank shafts 40 in the upper pressure assembly are turned in the opposite direction. These in turn impart an equal and opposite rotating motion to the lifter bars 38 which successively clamp or squeeze the sandwich assembly 48 together and impart a forward motion to the sandwich assembly toward the take-up reel 68. As the longitudinal motion ceases and the lifter bars 38 withdraw continuing their circular motion, the pressure is maintained on the sandwich assembly 48 by the center pressure bars 36. Thus, pressure is maintained substantially constant all the times due to the action of the floating lower pressure assembly 12. Furthermore, by the use of the belts 28 the sandwich assembly 48 is contained at all times and an equal pull toward the take-up reel is imparted simultaneously to all parts of the sandwich assembly including all the laminated material.

Figure 11A:
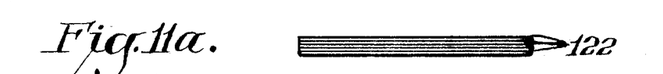
FIGS. 11a, b, and c are fragmental elevation views of different continuous belts which may be used in conjunction with apparatus illustrated in FIG. 3.
Figure 11B:
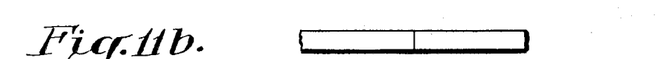
Figure 11C:
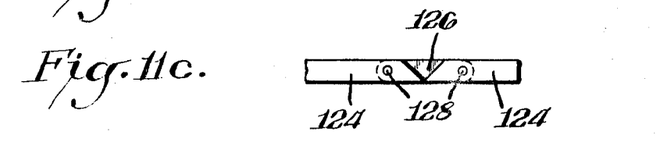

While the belts 28 have been described as a single stainless steel belt, the illustrations of FIGS. 11a, b and c described alternatives. Thus, as seen in FIG. 11a the belt may comprise a plurality of stainless steel strips or webs 122. This imparts greater strength to the belt.

In FIG. 11b are shown two abutting platens. In this embodiment, a series of individual platens is fed, one above the other (not shown), with the material to be laminated therebetween. As a given individual sandwich is fed into the apparatus an additional individual sandwich is placed up against it so that a continuous train is maintained through the apparatus. At the exit end each individual platen is removed and returned to the inlet end and the laminate is collected.

Finally, in the arrangement illustrated in FIG. 11c the belt may be comprised of a plurality of plates 124 each linked together by appropriate lengths 126 and linking studs 128. This permits the belt to track around the idler rollers 64. In each case the belt is preferably constructed of a suitable metal and preferably of stainless steel.

Figure 2:
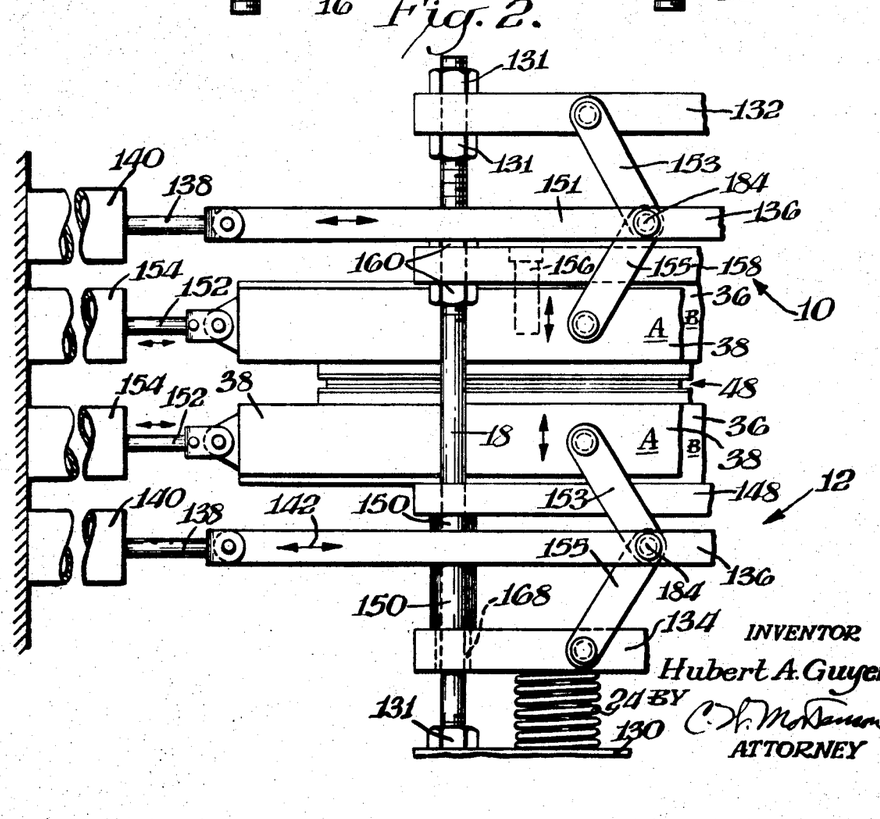
FIG. 2 is a diagrammatic elevation view of another embodiment.

Shown in FIG. 2 is an alternative embodiment to that illustrated schematically in FIG. 1. In the embodiment of FIG. 2 pressure is maintained on the sandwich 48 and forward motion is imparted thereto not by a rotary drive with the eccentric cam arrangement illustrated in conjunction with FIG. 1, but rather by a pneumatic, hydraulic or mechanical drive arrangement. The upper and lower pressure assemblies are operated, for example, by pneumatic cylinders and employ a knuckle and tie bar assembly to provide the compression of the sandwich assembly 48 and to provide the longitudinal movement of the sandwich assembly 48 through the laminating machine.

The upper pressure assembly 10 will be described first. To begin with, the entire assembly is positioned by tie rods 18 which are secured at the bottom to a fixed floor or plate 130 as by a nut 131 and at the upper end to a second plate 132 which is fixed in position by nuts 131 secured to each side of the plate. The nuts 131 engage the threaded end of the tie bar 18. A floating base 134 is supported by springs 24 which rest upon the fixed plate 130. In addition the tie rod 18 is journaled in a suitable bearing 168 in the floating base plate 134 so that movement in the vertical direction of the floating base plate is permitted. A drive member 136 is adapted to be actuated through the piston rod 138 of a pneumatic cylinder 140. The drive member 136 moves back and forth in the horizontal plane as indicated by the arrows 142. A spacer sleeve 150 maintains a predetermined minimum distance between the floating suport plate 148 and the floating base plate 134. A first knuckle 153 is pivotably mounted to the lifter bar 38 and to the drive member 136. In a similar manner, a second knuckle 155 is pivotably mounted to the drive member 136 at the same point 184 as the first knuckle 153 and at its other end to the floating base plate 134. The center pressure bar 36 is fixedly mounted to the floating support plate 148 in a manner similar to that with which it is mounted to the floating support assembly 22 in FIG. 1. To complete the lower pressure assembly, the lifter bar 38 is connected through a piston rod 152 to a second pneumatic cylinder 154 to provide back and forth motion to the lifter bar 38 in a horizontal plane.

In operation, the lower pressure assembly 12 is now actuated by energizing both pneumatic cylinders 140 and 154 to operate alternatively but cooperatively to maintain pressures on and to move the sandwich longitudinally.

Thus in the lower platen assembly, the piston rod 138 is pulled to the left by the pneumatic cylinder 140. This motion acting on the bar 136 tends to straighten the two knuckles 153 and 155 which moves the lifter bar 38 upwardly so as to lift the sandwich off elements 36 as described before. Then the piston rod 152 moves to the left thereby acting through the lifter bar 38 to cause the sandwich 48 to advance longitudinally to the left. Next, a reversal action occurs. Piston rod 138 moves to the right acting through tie bar 136 causing the knuckles 153, 155 and lifting bar 38 to relax. The decreased distance of lifting bar 38 is taken up by the springs 24 urging the floating base 134 coacting through the sleeve 150 to maintain floating support plate 148 and central pressure bar 36 in contact with the sandwich assembly 48. Then, piston rod 152 moves to the right, repositioning for another longitudinal movement of the assembly 48 to the left.

The upper assembly 10 operates in the same manner described for the lower, the primary difference being that the upper unit is fixed. The upper pressure bar 36 is secured by bolts 156 to a fixed support plate 158 which is secured as by nuts 160 to the tie rod 18. With this arrangement of the pistons 138 and 152 the motion upon the sandwich 48 is substantially the same as that described in FIG. 1 where first the sandwich is compressed by the center bar 36 and then alternately compressed by the lifter bars 38 and moved forward by these same lifter bars after which pressure is again applied through the center pressure bars 36. The motion continues cyclic this fashion until the complete sandwich is passed through the laminating area.

The apparatus of this invention is a press containing pressure elements which can be varied in their distance from each other without changing the pressure on the material being pressed together. Upper and lower pressure elements 36 illustrate this as do lifters 38. The source of energy for maintaining the pressure may be springs or hydraulic presses or combinations thereof and the means for effecting the distance change includes pneumatic, hydraulic, mechanical or electrical drive arrangements. The process of this invention comprises a method for continuously moving material through a stationary apparatus in which pressure elements are made to exert pressure on the material as it advances through the apparatus.

There has thus been described a novel, economical, simple system which is capable of laminating relatively wide areas of material in a continuous operation and with highly reproducibly controlled results. To increase the width of the laminate, it is merely necessary to increase the number of center pressure bars 36 and lifter bars 38 that run the length of the machine. The sequence is that of alternate disposition wherein each center pressure bar 36 is separated by a lifter bar 38. It is the lifter bars 38, however, that produce the forward motion of the sandwich 48 through the machine. The function of the center pressure bars 36 is to maintain applied pressure during alternate cycles. The fact that the lower pressure assembly is floating permits the pressure to be maintained relatively constant on the sandwich 48 throughout the entire operation. The floating effect affords speedly, continuous laminating.

Further, the apparatus of this invention is readily adopted for a variety of operations. For example, platens are not needed, though preferred in certain instances, and it is possible to use restrictive edges in connection with belts or platens and then to mold or cast resins, liquids or the like in a continuous fashion.

While the invention has been disclosed herein in connection with certain embodiments and certain structural and procedural details, it is clear that changes, modifications or equivalents can be used by those skilled in the art; accordingly, such changes within the principles of this invention are intended within the scope of the claims below.

I claim:

1. Apparatus containing pressure elements and means for varying the distance between pressure elements without changing the pressure on the material being pressed together which is apparatus for advancing a laminate in a continuous fashion and under pressure while it is in said apparatus and which comprises a first means comprising means for simultaneously exerting pressure on the top surface and the bottom surface of the said laminate and while it is under said pressure for moving it away from the inlet of said apparatus toward the outlet of said apparatus; a second means comprising a means for deactivating said first means and for activating it in a continuous repetitive manner; and a third means comprising a pressure means which automatically exerts pressure on said surfaces of said lamination upon the deactivation of said first means and which automatiually ceases to exert pressure on said surfaces upon the activation of said first means.

2. Apparatus in accordance with claim 1 in which said first means comprises a pair of pressure elements, one located to contact the top surface of said lamination and the other located to contact the bottom surface of said lamination and both being driven simultaneously to exert pressure and to move said lamination toward the exist end of said apparatus.

3. Apparatus in accordance with claim 2 in which said elements contain eccentric cams driven in opposite directions.

4. Apparatus in accordance with claim 1 which includes a platen immediately above said lamination and a platen immediately below said lamination, said plates being capable of movement along the length of said apparatus.

5. Apparatus in accordance with claim 2 in which said second means comprises an eccentric cam journalled in each of said elements of said first means and synchronously rotated in respect to each other whereby a complete rotation of each effects simultaneously with the other the steps of making said elements contact said laminate, exert pressure thereon, move it toward said outlet, cease exerting said pressure and move out of contact with said laminate.

6. Apparatus in accordance with claim 2 in which said second means comprises knuckles.

7. Apparatus in accordance with claim 1 in which said third means comprises a pair of pressure elements, the first located on one side of said lamination and mounted in a stationary position and the second located on the other side of said lamination and mounted in a movable fashion on a source of energy, said source of energy capable of urging said second pressure element toward said first pressure element and upon the deactivation of said first means causing said elements to exert pressure on the lamination between said first and said second pressure elements and said source of energy being capable to move said second pressure element away from said pressure element upon the activation of said first means.

8. Apparatus in accordance with claim 7 in which said source of energy is a hydraulic press.

9. Apparatus in accordance with claim 7 in which said source of energy is springs.

10. Apparatus in accordance with claim 1 in which said second means comprises pivotably mounted knuckles adapted to expand to exert pressure while said lamination is being held stationary momentarily and to contract to release said pressure while said lamination is being moved toward said outlet.

11. Apparatus in accordance with claim 10 which includes pneumatic cylinders which activate panels to move said lamination toward said outlet when said arms are contracted and which return said panels to their initial position when said arms are expanded.

12. Apparatus in accordance with claim 11 in which said expansion is effected by a source of energy simultaneously with said removal of said panels to their initial position.

13. Apparatus for sustaining pressure on an assembly being laminated while it is being moved toward the exit end of said apparatus which comprises (1) a source of stored energy contained between the fixed top and fixed bottom of said apparatus, (2) located between said top and said bottom at least two separately acting pressure elements each pressure element having one part located on one side of said assembly and the other part being located on the opposite side of said assembly and each affording pressure on said assembly when the other is not and (3) means for holding the pressure constant on said assembly irrespective of the distance between its top surface and top of said apparatus and irrespective of the distance between its bottom surface and the bottom of said apparatus.

References Cited

UNITED STATES PATENTS

| | | | |
|---|---|---|---|
| 1,803,779 | 5/1931 | Stevens | 156—555X |
| 2,046,047 | 6/1936 | Watkins | 156—580 |
| 2,620,837 | 12/1952 | Quick | 156—555X |
| 2,715,934 | 8/1955 | Sabee et al. | 156—555 |
| 2,993,527 | 7/1961 | Moser et al. | 156—11X |
| 3,133,850 | 5/1964 | Alenius | 156—580X |
| 3,229,620 | 1/1966 | Rogers et al. | 156—555X |
| 3,309,983 | 3/1967 | Dresser | 156—555X |

REUBEN EPSTEIN, Primary Examiner

U.S. Cl. X.R.

100—151; 156—312, 324, 580